United States Patent Office 3,544,957
Patented Dec. 1, 1970

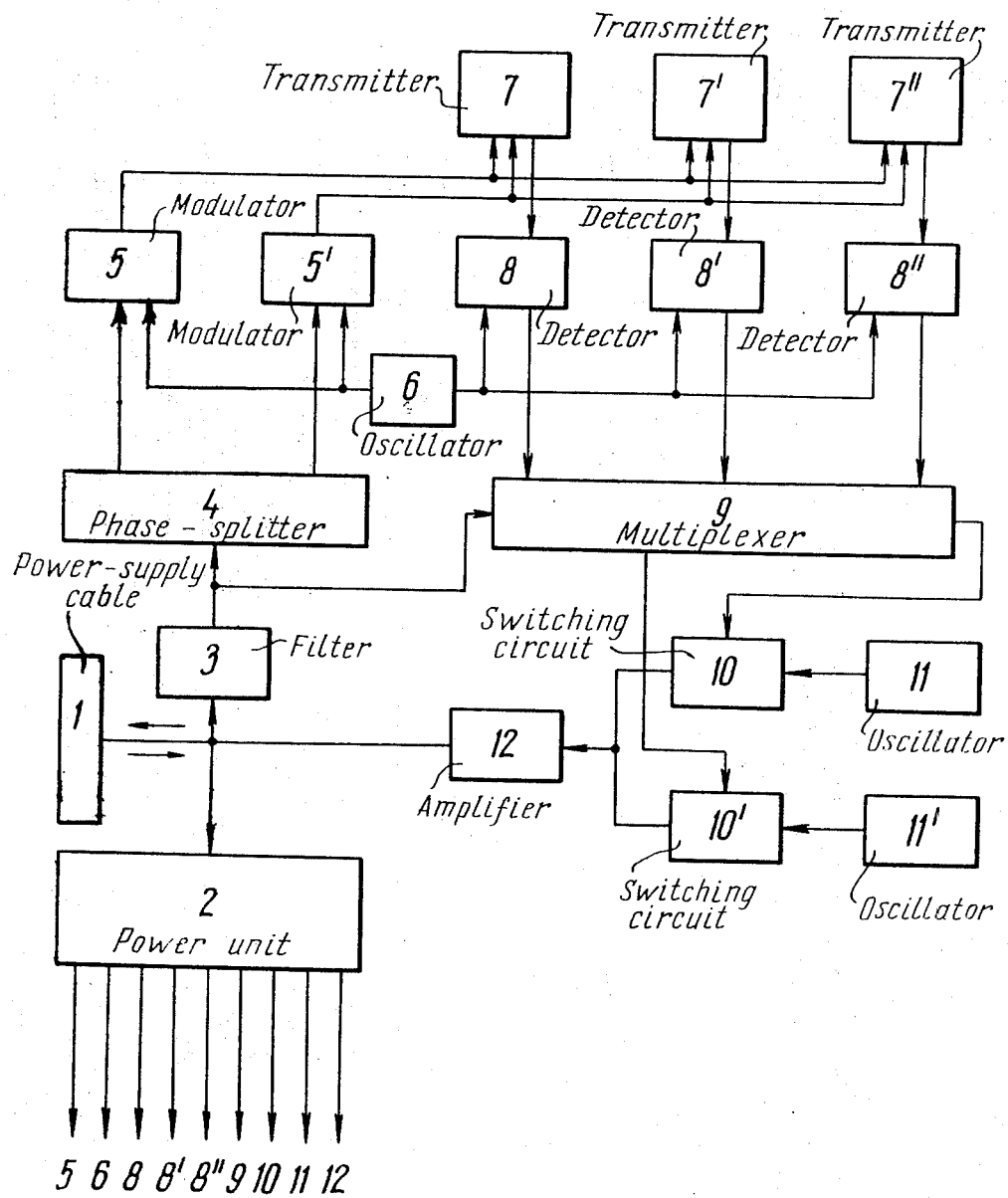

3,544,957
ELECTRONIC INCLINOMETER FOR ELECTRIC DRILLS
Alexandr Georgievich Smetanin, Ulitsa Sovetskaya 13, korpus 1, kv. 104, and Valentin Vasilievich Golovanov, Ulitsa Pervomaiskaya 8, kv. 57, both of Istra Moskovskoi Oblasti, U.S.S.R.
Filed Feb. 11, 1969, Ser. No. 798,369
Int. Cl. E21b 47/022
U.S. Cl. 340—18    1 Claim

ABSTRACT OF THE DISCLOSURE

An electronic inclinometer comprising a bore-hole tool which uses phase-angle transmitters to sense the position of the electric drill and whose supply circuit contains a phase splitter energized from the power-supply cable of the electric drill at the supply-voltage frequency and controlling operation of a multiplexer separating in time the output signals of the transmitters and connected to a frequency changer converting the low-frequency transmitter signals into R.F. code pulses fed to a surface decoder, and in which the R.F. carrier oscillator is connected to at least two modulators placed between the phase-splitter and the transmitters in the supply circuit of the latter, and to detectors placed one each between the output of each transmitter and the input of the time multiplexer and performing synchronous demodulation of the transmitter signals.

---

The present invention relates to instruments for remote determination of the spatial position of objects by the use of wire data-transmission circuits, and more specifically to inclinometers for electric drills, intended to determine the inclination and direction of bore-holes and electric drills in the course of drilling.

Widely known in the art are electronic inclinometers for electric drills, comprising a bore-hole tool run into the bore-hole being measured, and a surface receiver-decoder. The bore-hole tool of such an inclinometer uses synchro phase-angle transmitters whose low-frequency output signals carry information about the position of the drill in the bore-hole. The synchro transmitters are energized from the power-supply cable of the electric drill through a phase splitter which splits up the supply voltage at the supply frequency into two voltages displaced through 90° from each other. The outputs of the synchro transmitters are connected to a multiplexer which separates the transmitter output signals in time and is connected to a frequency changer converting the low-frequency synchro signals into R.F. code pulses. Converted into R.F. code pulses, the synchro transmitter signals are conveyed by the power-supply cable of the drill to the surface receiver-decoder.

Such inclinometers directly measure the inclination and direction of the electric-drill deflector. However, the inclinometers referred to can measure the azimuth angles of the electric drill in an indirect way, by the consecutive-traverse method, through analysis of the readings furnished by the synchro transmitters which sense the inclination and direction of the drill deflector.

The inclinometers referred to suffer from a disadvantage which consists in that the additional computation and comparison of inclinometer readings which have to be done in order to determine the azimuth angles of the electric drill and of the bore-hole, slow down the work and impair the accuracy of measurements as the depth of the bore-hole increases. Another disadvantage is that such inclinometers impose certain limitations on the lifting and lowering operations because the bore-hole tool has to be oriented in the bore-hole mouth before lowering and held thus oriented as it is run down.

There also exists inclinometers for the direct measurement of azimuth angles, using contact transmitters. However, they do not provide for continuous measurement and registration of the operating angles of the electric drill and are not sufficiently reliable in operation.

An object of the present invention is to eliminate the above-mentioned disadvantages.

These objects are accomplished by an electronic inclinometer comprising a bore-hole tool which uses phase-angle transmitters to sense the position of the electric drill and whose supply circuit contains a phase splitter energized from the power-supply cable of the electric drill at the supply-voltage frequency and controlling operation of a multiplexer separating in time the output signals of the transmitters and connected to a frequency changer converting the low-frequency transmitter signals into R.F. code pulses fed to a surface decoder, and in which, according to the invention, the R.F. carrier oscillator is connected to at least two modulators placed between the phase-splitter and the transmitters in the supply circuit of the latter, and to detectors placed one each between the output of each transmitter and the input of the time multiplexer and performing synchronous demodulation of the transmitter signals.

The invention will be best understood from the following description of a preferred embodiment when read in connection with the accompanying drawing which shows a block-diagram of the bore-hole tool of an electronic inclinometer according to the invention.

The bore-hole tool of the inclinometer disclosed herein is placed in a hermetically sealed enclosure (not shown in the drawing), made of a non-magnetic material and mounted in a non-magnetic tube above the electric drill.

The power-supply cable 1 is connected through a H.V. plug-and-socket to a power unit 2 which feeds the electronic units of the bore-hole tool.

Connected to the power-supply cable 1 is a filter 3 designed to transmit the first harmonic of the supply frequency of the electric drill. The output of the filter 3 is connected to a phase-splitter 4 composed of phase-shifting RC-networks and shaping two voltages of equal amplitude at the supply frequency of the electric drill, shifted through 90° from each other. One of the outputs of the phase-splitter 4 is connected to a modulator 5, and the other output to another modulator 5'. Also connected to the modulators 5 and 5' is an R.F. (about 20 kc./s.) carrier oscillator 6. The phase-angle transmitters 7, 7' and 7", which respectively sense the azimuth, inclination and position of the drill deflector, are synchros, each having a rotor and a stator made of a non-magnetic material. The control windings of the transmitters 7, 7' and 7" are connected to the outputs of the modulators 5 and 5'. The rotors of the transmitters 7' and 7" which sense the inclination and position of the drill deflector are coupled to eccentric dead-weights which act as plumb-bobs. The rotor of the azimuth transmitter 7 is coupled to a magnetic rod (a pointer).

The inclinometer disclosed herein also comprises as many detectors 8, 8' and 8", as there are transmitters and which have their inputs connected to the outputs of the respective transmitters 7, 7' and 7" and the oscillator 6, while their outputs are connected to a time multiplexer 9 separating in time the signals it receives from the detectors 8, 8' and 8" and, consequently, the signals coming from the outputs of the transmitters 7, 7' and 7".

The multiplexer 9 is also connected to the same filter 3 and is also fed with the same voltage as the phase-splitter 4. The outputs of the multiplexer 9 are connected to switching circuits 10 and 10' which connect oscillators 11 and 11' in turn to an amplifier 12 whose output is the output of the bore-hole tool and is connected to the power-supply cable 1.

The power-supply cable 1 of the electric drill is used as a data-transmission line between the bore-hole tool and the surface receiver-decoder (not shown in the drawing) of the coded signals coming from the bore-hole tool.

The inclinometer disclosed herein operates as follows.

The supply voltage fed to the electric drill over the power-supply cable 1 is applied to the power unit 2 and the filter 3, and the bore-hole tool is turned on. As a result, the supply voltage, after it is transformed, stabilized and rectified in the power unit 2, is fed to the electronic units 5, 6, 8, 8', 8", 9, 10, 11 and 12, while from the output of the filter 3, after the higher harmonics have been suppressed, the voltage is applied to the phase-splitter 4 and the time multiplexer 9.

The phase-splitter 4 produces two voltages displaced in time phase through 90° from each other, one of which is applied to the modulator 5 and the other to the modulator 5'. The two modulators also accept the R.F. carrier voltage from the oscillator 6. From the modulators, the R.F. carrier modulated by the low-frequency voltage is fed to the transmitters 7, 7' and 7". Thus, each of the said transmitters is simultaneously energized by two voltages at the frequency of the oscillator 6, amplitude-modulated by the supply-frequency voltage of the electric drill, one voltage varying sinusoidally and the other cosinusoidally.

The phase of the modulating voltage at the outputs of the transmitters 7, 7' and 7" depends on the position of their rotors, which is in turn determined by the value of the angle being measured. Thus, the transmitters 7, 7' and 7" convert physical quantities, that is, the angle of azimuth, inclination and position of the electric-drill deflector, into proportional variations in the phase of the envelope of the transmitter outputs voltage. The detectors 8, 8' and 8" simultaneously accept voltages from the respective transmitters 7, 7' and 7" and the oscillator 6. Owing to synchronous detection, the sine-wave voltage appearing at the detector outputs has the same frequency as the one transmitted by the filter 3, but with a phase angle changed in proportion to the deflection of the transmitter rotor and, consequently, to the value of the angle being measured.

The detected voltage from the outputs of the detectors 8, 8' and 8" is applied to the time multiplexer 9 built around a binary scaler functionally combined with a magnetic switching matrix which is made up of miniature magnetic cores and has a high sensitivity to changes of polarity of the voltage coming from the detectors 8, 8' and 8". The instant at which the voltage changes sign is determined for the purpose of measuring its phase by comparison with the instant at which the voltage fed to the multiplexer 9 from the filter 3 and used as a sync voltage passes through zero.

At the outputs of the multiplexer 9 there appears a time sequence (train) of low-frequency pulses each of which has its beginning at the instant when the voltage from the respective detector passes through zero. In other words, information about the magnitude of the angle being measured is represented in the form of width-modulated pulses. Each pulse train corresponds to a certain position of the electric drill. This pulse train is applied to the switching circuit 10. In order to separate one pulse train from another, the multiplexer 9 generates a so-called phasing pulse which corresponds to the beginning of a pulse train and is applied to the switching circuit 10'. The switching circuits 10 and 10' connect the R.F. oscillators 11 and 11' to the amplifier 12 at regular intervals, in accordance with the duration of the pulses coming from the output of the multiplexer 9. Thus, the frequency changer formed by the switching circuits 10 and 10' and the oscillators 11 and 11' convert the low-frequency pulses into R.F. pulse trains transmitted through the amplifier 12 and the power-supply cable 1 of the electric drill to the surface receiver-decoder which decodes the R.F. pulses. The oscillators 11 and 11' generate the carrier frequencies which are chosen so as to provide for the maximum immunity of the signals transmitted over the power-supply cable to noise.

The surface receiver (not shown in the drawing) demodulates and decodes the R.F. pulses arriving over the power-supply cable by converting them into D.C. voltages proportional to the magnitudes of the respective angles of azimuth, inclination and position of the drill deflector. These voltages are finally fed to instruments presenting visual display and producing permanent records.

The instrument disclosed herein makes it possible to appreciably enhance the accuracy of measurement of the angles characterizing the position of the electric drill and also to measure azimuth simultaneously with the angle of inclination and position of the deflector, a thing unattainable with existing inclinometers.

What is claimed is:

1. An electronic inclinometer for electric drills, operating in conjunction with a surface receiver-decoder of its output signals and comprising: phase transmitters whose output signal depends on the position of the electric drill; a phase-splitter operating at the supply frequency of said electric drill and connected to its power-supply cable and placed in the supply circuit of said transmitters; an R.F. oscillator; at least two modulators to modulate the output of said R.F. oscillator, placed between said phase-splitter and said transmitters in the supply circuit of the latter; a time multiplexer connected to the power-supply cable of said electric drill and separating in time the output signals of said transmitters; as many detectors as there are transmitters, each placed between the output of each of said transmitters and the input of said time multiplexer for synchronous detection of transmitter signals, said detectors also being connected to said R.F. oscillator; a frequency changer to convert the low-frequency output signals of said time multiplexer into R.F. code pulses, placed at the output of said time multiplexer; said phase transmitters, phase-splitter, modulators, R.F. oscillator, detectors, time multiplexer, and frequency changer making up a bore-hole tool run into the drill-hole being investigated, whose output is the output of the frequency changer connected to the power-supply cable of the electric drill for the transmission of code pulses to said surface receiver-decoder.

References Cited

UNITED STATES PATENTS 2,435,934  2/1948  Varney et al. _____ 340—18

RICHARD A. FARLEY, Primary Examiner

D. C. KAUFMAN, Assistant Examiner

U.S. Cl. X.R.

33—205; 175—45